United States Patent
Takase et al.

(10) Patent No.: US 12,467,571 B2
(45) Date of Patent: Nov. 11, 2025

(54) EMERGENCY RELEASE MECHANISM OF FLUID LOADING EQUIPMENT

(71) Applicants: KAWASAKI JUKOGYO KABUSHIKI KAISHA, Kobe (JP); TB GLOBAL TECHNOLOGIES LTD., Tokyo (JP)

(72) Inventors: Tomonori Takase, Kobe (JP); Akihiko Inomata, Kobe (JP); Tsutomu Kawai, Nagaoka (JP); Yuma Yoshihara, Nagaoka (JP)

(73) Assignees: KAWASAKI JUKOGYO KABUSHIKI KAISHA, Hyogo (JP); TB GLOBAL TECHNOLOGIES LTD, Tokyo (JP)

( * ) Notice: Subject to any disclaimer, the term of this patent is extended or adjusted under 35 U.S.C. 154(b) by 0 days.

(21) Appl. No.: 18/575,178

(22) PCT Filed: Feb. 8, 2022

(86) PCT No.: PCT/JP2022/004855
§ 371 (c)(1),
(2) Date: Dec. 28, 2023

(87) PCT Pub. No.: WO2023/276233
PCT Pub. Date: Jan. 5, 2023

(65) Prior Publication Data
US 2024/0301965 A1    Sep. 12, 2024

(30) Foreign Application Priority Data
Jun. 29, 2021   (JP) ................................. 2021-107608

(51) Int. Cl.
*F16L 37/36*    (2006.01)
*F16K 49/00*    (2006.01)

(52) U.S. Cl.
CPC .............. *F16L 37/36* (2013.01); *F16K 49/00* (2013.01); *Y10T 137/6416* (2015.04); *Y10T 137/7036* (2015.04); *Y10T 137/87925* (2015.04)

(58) Field of Classification Search
CPC . F16L 37/30; F16L 37/32; F16L 37/36; F16L 29/00; F16L 29/002; F16L 29/007;
(Continued)

(56) References Cited

U.S. PATENT DOCUMENTS 1,000,945 A * 8/1911 Ray .......................... F16L 37/23
                                                      137/614
1,082,512 A * 12/1913 Gainer ...................... F25C 1/04
                                                      62/448
(Continued)

FOREIGN PATENT DOCUMENTS

| JP | S51126512 A | 11/1976 |
| JP | H01294500 A | 11/1989 |
| JP | 2018128120 A | 8/2018 |

*Primary Examiner* — Kenneth Rinehart
*Assistant Examiner* — Jonathan J Waddy
(74) *Attorney, Agent, or Firm* — Alleman Hall & Tuttle LLP

(57) ABSTRACT

An emergency release mechanism is applied to fluid loading equipment for transporting fluid, and includes: a pair of pipe portions having a vacuum double structure in each of which a flow path for transporting the fluid is formed, the pair of pipe portions being arranged with opening ends abutting against each other; a coupling member capable of coupling the pair of pipe portions to each other and being removed therefrom; and a pair of shutoff valves configured to shut off the flow path in the pipe portions. The pair of pipe portions respectively include valve seats formed in the flow path. The shutoff valves respectively include valve bodies configured to seat on the respective valve seats to close the flow path, and linear motion drive devices configured to move the
(Continued)

respective valve bodies along the flow path to cause the valve bodies to seat on the respective valve seats.

1 Claim, 3 Drawing Sheets

(58) Field of Classification Search
CPC ....... B63B 27/24; F16K 31/122; F16K 49/00; F16K 49/005; Y10T 137/6416; Y10T 137/6525; Y10T 137/6552; Y10T 137/6579; Y10T 137/7036; Y10T 137/87925; Y10T 137/87933; Y10T 137/87973; Y10T 137/88022
USPC .......... 137/614, 614.16, 375, 334, 338, 339, 137/340, 614.01, 614.06; 251/142, 149
See application file for complete search history.

(56) References Cited

U.S. PATENT DOCUMENTS

| | | | | |
|---|---|---|---|---|
| 2,120,677 | A | * | 6/1938 | Oliver ..................... B60T 17/04 188/3 R |
| 2,372,820 | A | * | 4/1945 | Gardes ................. F16L 29/007 137/614 |
| 2,502,630 | A | * | 4/1950 | Morrison ................ F25B 41/40 137/614 |
| 2,543,590 | A | | 2/1951 | Swank |
| 2,816,567 | A | | 12/1957 | Rittenhouse et al. |
| 2,934,915 | A | * | 5/1960 | Morse ..................... F25B 41/40 62/298 |
| 2,948,307 | A | | 8/1960 | Rittenhouse et al. |
| 3,060,978 | A | | 10/1962 | Botkin |
| 3,144,056 | A | | 8/1964 | Mosher |
| 3,152,452 | A | * | 10/1964 | Bond, Jr. .............. F16L 59/141 62/50.7 |
| 3,371,680 | A | * | 3/1968 | Alcorn, Jr. .............. F16K 49/00 137/340 |
| 4,816,083 | A | * | 3/1989 | Bangyan ............ F24D 19/1015 137/271 |
| 4,899,776 | A | | 2/1990 | Le Devehat |
| 4,989,638 | A | * | 2/1991 | Tervo ...................... F16L 37/30 251/291 |
| 5,379,793 | A | * | 1/1995 | Powell .................... F16L 29/04 137/15.16 |
| 5,664,759 | A | * | 9/1997 | Evans ................... F16K 27/003 251/63.5 |
| 5,810,031 | A | * | 9/1998 | Evans ................ C23C 16/4401 137/557 |
| 5,865,280 | A | * | 2/1999 | Kurachi ................ B60G 21/06 60/378 |
| 6,079,446 | A | * | 6/2000 | Tocha ................... F16L 59/141 62/50.7 |
| 2007/0068582 | A1 | * | 3/2007 | Rick ................... B29C 45/322 137/614 |
| 2020/0010314 | A1 | | 1/2020 | Kawai et al. |

\* cited by examiner

EMERGENCY RELEASE MECHANISM OF FLUID LOADING EQUIPMENT

This application is a national phase of International Application No. PCT/JP2022/004855, filed on Feb. 8, 2022, entitled EMERGENCY RELEASE MECHANISM OF FLUID LOADING EQUIPMENT which claims priority to JP2021-107608, filed on Jun. 29, 2021, the entire disclosures of each of which are incorporated herein by reference for all purposes.

TECHNICAL FIELD

The present invention relates to an emergency release mechanism of fluid loading equipment for transporting fluid.

BACKGROUND ART

Fluid loading equipment for transporting fluid such as liquefied gas from an onshore facility to a tank on a ship has been put into practical use. The fluid loading equipment includes an emergency release mechanism for use in disconnecting a joint from a movable pipe at the time of emergency. As an example of the emergency release mechanism, for example, an emergency release mechanism as described in Patent Literature 1 has been known. In the emergency release mechanism of Patent Literature 1, a valve body is urged by a spring member. In addition, at the time of disconnection, the urged valve body seats on a valve seat to close a flow path of a pipe.

CITATION LIST

Patent Literature

Patent Literature 1: Japanese Patent Laid-Open No. 2018-128120

SUMMARY OF INVENTION

Technical Problem

There is a demand for the fluid loading equipment to transport fluid in a larger flow rate. Thus, the pipe for transporting fluid is desired to be increased in diameter. Meanwhile, in the emergency release mechanism of Patent Literature 1, when the diameter of the pipe is increased, there is a possibility that a sufficient urging force for closing the flow path cannot be obtained from the spring member.

In view of the above, the present invention has an object to provide an emergency release mechanism of fluid loading equipment, which is capable of closing a flow path even when the pipe is increased in diameter.

Solution to Problem

An emergency release mechanism of fluid loading equipment according to the present invention is an emergency release mechanism of fluid loading equipment for transporting fluid, the emergency release mechanism including: a pair of pipe portions having a vacuum double structure in each of which a flow path for transporting the fluid is formed, the pair of pipe portions being arranged with opening ends abutting against each other; a coupling member capable of coupling the pair of pipe portions to each other and being removed therefrom; and a pair of shutoff valves configured to shut off the flow path, the pair of shutoff valves being provided to correspond to the respective pair of pipe portions, in which the pair of pipe portions respectively include valve seats formed in the flow path, and the shutoff valves respectively include valve bodies configured to seat on the respective valve seats of the corresponding pipe portions to close the flow path, and linear motion drive devices configured to move the respective valve bodies along the flow path to cause the valve bodies to seat on the respective valve seats.

According to the present invention, through use of the linear motion drive devices, the valve bodies can be moved with a large drive force. In this manner, even when the pipe portions are increased in diameter, the valve bodies can be moved against the fluid to close the flow paths of the pipe portions. That is, the valve bodies can be closed even when the pipes are increased in diameter.

Advantageous Effects of Invention

According to the present invention, the flow paths can be closed even when the pipes are increased in diameter.

The above-mentioned object, other objects, features, and advantages of the present invention will become apparent from the following detailed description of a preferred embodiment with reference to the accompanying drawings.

DESCRIPTION OF EMBODIMENTS

An emergency release mechanism 2 for fluid loading equipment 1 of an embodiment according to the present invention is hereinafter described with reference to the drawings described above. It is to be noted that a concept of directions used in the following description is used for easier understanding of the description, and is not intended to limit orientations or the like of configurations of the invention to those directions. Further, the fluid loading equipment 1 described below is merely an embodiment of the present invention. Accordingly, the present invention is not limited to the embodiment, and addition, deletion, and modification are allowed within the scope of the invention.

<Fluid Loading Equipment>

Figure 1:
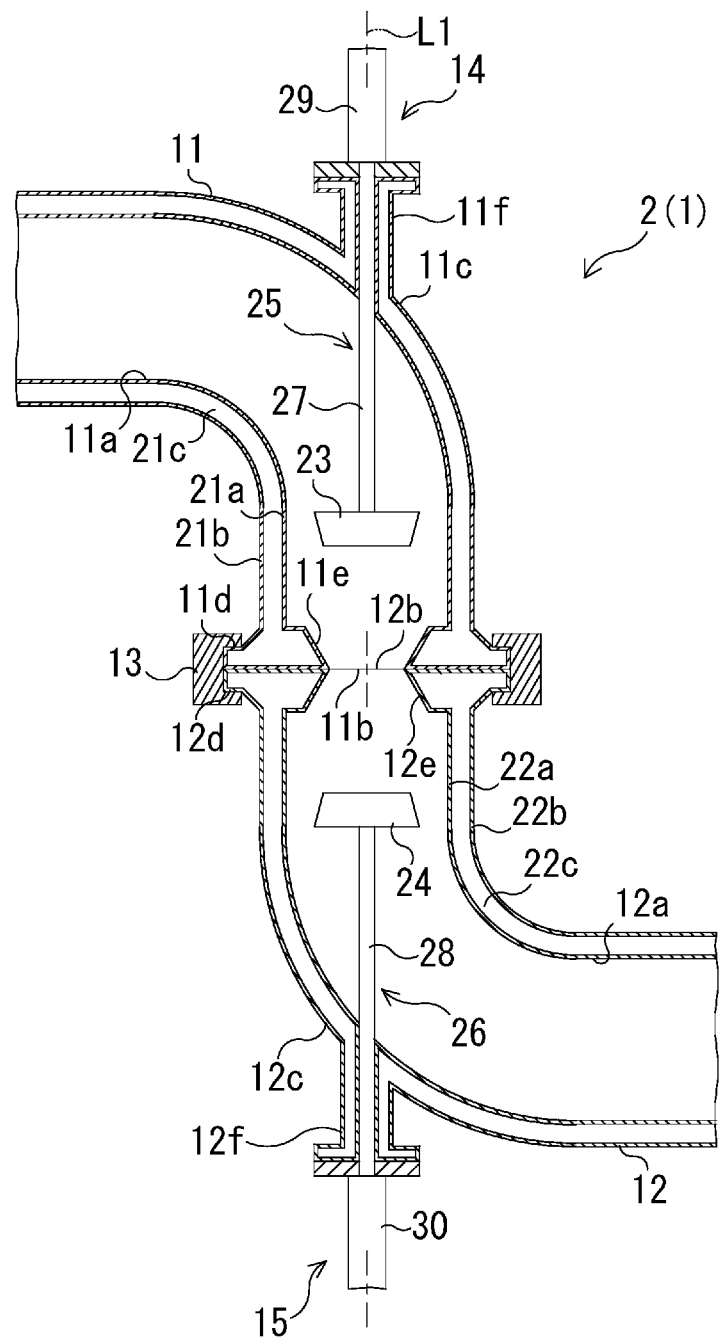
FIG. 1 is a cross-sectional view illustrating an emergency release mechanism of fluid loading equipment according to a first embodiment of the present invention.

The fluid loading equipment 1 illustrated in FIG. 1 is equipment for transporting fluid between a ship including a tank (for example, a tanker) and an onshore facility (for example, an onshore tank). In this embodiment, fluid to be transported is liquefied hydrogen. However, the fluid to be transported is not limited to liquefied hydrogen, and may be liquefied helium, LNG, or the like. Further, the fluid is not limited to liquid, and may be gas such as hydrogen gas. In addition, the fluid loading equipment 1 includes a movable pipe (not shown), an emergency release mechanism 2, and a joint (not shown). The movable pipe is connected to the onshore facility, and allows the fluid to flow therethrough. The joint is provided to a distal end portion of the movable pipe via the emergency release mechanism 2. The joint can be connected to the tanker. In addition, connection of the joint to the tanker allows the fluid to be transported between the onshore facility and the tanker via the movable pipe. Further, the movable pipe includes, for example, a support column and an arm. The support column is provided in the onshore facility. The arm has a distal end portion provided with the joint via the emergency release mechanism 2. In addition, the arm can turn about the support column or tilt upward or downward. In this manner, the joint can be moved to various positions.

<Emergency Release Mechanism>

The emergency release mechanism 2 allows the joint to be disconnected from the movable pipe. To describe it in more detail, the emergency release mechanism 2 includes a pair of pipe portions 11 and 12, a coupling member 13, and a pair of shutoff valves 14 and 15.

[Pipes]

The pair of pipe portions 11 and 12 are respectively connected to the arm of the movable pipe and the joint. To describe it in more detail, one pipe portion 11 is connected to the arm of the movable pipe, and the other pipe portion 12 is connected to the joint. Further, the pair of pipe portions 11 and 12 respectively have flow paths 11a and 12a formed therein for transporting the fluid. The flow paths 11a and 12a respectively have opening ends 11b and 12b that open at one ends of the pair of pipe portions 11 and 12. In addition, the pair of pipe portions 11 and 12 are arranged such that the opening ends 11b and 12b abut against each other. In this manner, the pair of pipe portions 11 and 12 are connected to each other such that the flow paths 11a and 12a communicate with each other. Further, the pair of pipe portions 11 and 12 can be separated away from each other at the respective opening ends 11b and 12b.

Further, the pair of pipe portions 11 and 12 are each an L-shaped elbow pipe fitting, and respectively include elbow parts 11c and 12c and flange portions 11d and 12d. To describe it in more detail, the pair of pipe portions 11 and 12 respectively have parts on sides of the opening ends 11b and 12b, that is, one-end-side parts that are linearly formed to extend along an axis L1. In addition, the elbow parts 11c and 12c are respectively formed in intermediate parts of the pipe portions 11 and 12. In this embodiment, the elbow parts 11c and 12c are formed to communicate with the one-end-side parts described above. In addition, the pipe portions 11 and 12 are bent at a predetermined angle by the respective elbow parts 11c and 12c. It is to be noted that the predetermined angle is 90 degrees in this embodiment, but this angle is not limited and may be 45 degrees or 180 degrees.

The flange portions 11d and 12d are formed to protrude radially outward in respective parts of the pipe portions 11 and 12 on sides of the opening ends 11b and 12b. In this embodiment, the flange portions 11d and 12d are respectively formed in outer peripheral surfaces of the pipe portions 11 and 12 over the entire circumference in a circumferential direction. In addition, the pair of pipe portions 11 and 12 are arranged such that the flange portions 11d and 12d abut against each other. Moreover, the pair of pipe portions 11 and 12 are arranged as follows in the abutment state in this embodiment. That is, the pair of pipe portions 11 and 12 are arranged such that a part of the one pipe portion 11 on an arm side with respect to the elbow part 11c and a part of the other pipe portion 12 on a joint side with respect to the elbow part 12c are parallel to each other in a direction intersecting with an axial direction in which the axis L1 extends (in this embodied fluid, orthogonal direction).

Further, the pair of pipe portions 11 and 12 are each a pipe member having a vacuum double structure. To describe it in more detail, the pair of pipe portions 11 and 12 respectively include inner tube parts 21a and 22a and outer tube parts 21b and 22b. In the inner tube parts 21a and 22a, inner holes being the flow paths 11a and 12a are formed along respective axes of the inner tube parts 21a and 22a. The outer tube parts 21b and 22b cover the respective inner tube parts 21a and 22a with radial spacings defined therebetween. In addition, both end portions are closed between the inner tube parts 21a and 22a and the outer tube parts 21b and 22b. In this manner, vacuum layers 21c and 22c are formed between the inner tube parts 21a and 22a and the outer tube parts 21b and 22b. In addition, the vacuum layers 21c and 22c suppress heat input to the respective flow paths 11a and 12a in the pipe portions 11 and 12. That is, a temperature of the fluid flowing through the flow paths 11a and 12a can be kept. For example, a temperature of the liquid can be kept to a cryogenic temperature at the time of transportation of the fluid.

Moreover, the pair of pipe portions 11 and 12 respectively include valve seats 11e and 12e. The valve seats 11e and 12e are formed in the respective flow paths 11a and 12a. To describe it in more detail, the valve seats 11e and 12e are formed on sides of the opening ends 11b and 12b in the flow paths 11a and 12a. It is to be noted that the valve seats 11e and 12e are formed to communicate with the respective opening ends 11b and 12b in this embodiment, but the valve seats 11e and 12e may be formed to be separated from the respective opening ends 11b and 12b on axially inner sides of the pipe portions 11 and 12. Further, the valve seats 11e and 12e are formed by causing the inner tube parts 21a and 22a to protrude radially inward over the entire circumference in the circumferential direction. In addition, the valve seats 11e and 12e are formed to decease in size toward the respective opening ends 11b and 12b (for example, into a tapered shape or a stepped shape). In this embodiment, the valve seats 11e and 12e are each formed into a tapered shape.

[Coupling Member]

The coupling member 13 is a member for coupling the pair of pipe portions 11 and 12 to each other. To describe it in more detail, the coupling member 13 couples the flange portions 11d and 12d abutting against each other. Further, the coupling member 13 can be removed from the pair of pipe portions 11 and 12. In addition, the pair of pipe portions 11 and 12 can be separated away from each other through removal of the coupling member 13. In this embodiment, the coupling member 13 is a clamper. That is, the coupling member 13 clamps the flange portions 11d and 12d to couple the pair of pipe portions 11 and 12 to each other. Further, when the coupling member 13 being the clamper is opened, the clamping with respect to the flange portions 11d and 12d can be released, and the coupling member 13 can be removed from the pair of pipe portions 11 and 12. It is to be noted that the coupling member 13 is not limited to a clamper, and may be a fastening member such as a bolt. That is, it suffices that the coupling member 13 be capable of coupling the pair of pipe portions 11 and 12 to each other and being removed therefrom.

[Shutoff Valves]

The pair of shutoff valves 14 and 15 are provided in corresponding pipe portions 11 and 12. In addition, the pair of shutoff valves 14 and 15 shut off the respective flow paths 11a and 12a of the corresponding pipe portions 11 and 12. To describe it in more detail, the pair of shutoff valves 14 and 15 respectively include valve bodies 23 and 24 and linear motion drive devices 25 and 26.

[Valve Bodies]

The valve bodies 23 and 24 seat on the respective valve seats 11e and 12e of corresponding pipe portions 11 and 12. In addition, the valve bodies 23 and 24 seat on the respective valve seats 11e and 12e to close the respective flow paths 11a and 12a. Further, the valve bodies 23 and 24 are arranged in the respective flow paths 11a and 12a. In addition, the valve bodies 23 and 24 move from a closed position to an open position along the respective flow paths 11a and 12a. The closed position is a position at which the valve bodies 23 and 24 seat on the respective valve seats 11e and 12e, and the open position is a position at which the valve bodies 23 and 24 are separated from the respective valve seats 11e and 12e.

The valve bodies 23 and 24 are arranged in the one-end-side parts (that is, linear parts) of the pair of pipe portions 11 and 12 in this embodiment. The flow paths 11a and 12a extend in the axial direction in the one-end-side parts of the pair of pipe portions 11 and 12. In addition, the valve bodies 23 and 24 are configured to be movable along the axis L1 along the respective flow paths 11a and 12a. It is to be noted that the valve bodies 23 and 24 are not always required to be movable along the axis L1. For example, the valve bodies 23 and 24 may move along directions tilting by a predetermined angle (for example, 30 degrees or less) with respect to the axis L1. Such a case has the same meaning as the case in which the valve bodies 23 and 24 move along the respective flow paths 11a and 12a.

To describe it in more detail, the valve bodies 23 and 24 are formed to decrease in size toward distal end sides (for example, into a truncated cone shape or a stepped shape), similarly to the valve seats 11e and 12e. In this embodiment, the valve bodies 23 and 24 are each formed into a tapered shape similarly to the valve seats 11e and 12e. In addition, the valve bodies 23 and 24 seat on the respective valve seats 11e and 12e. In this case, the flow paths 11a and 12a are closed. Further, outer diameters of the valve bodies 23 and 24 are formed to be smaller than diameters of the flow paths 11a and 12a. Thus, while the valve bodies 23 and 24 are positioned at the open position, the fluid flows between the flow path 11a of the one pipe portion 11 and the flow path 12a of the other pipe portion 12.

Figure 2:
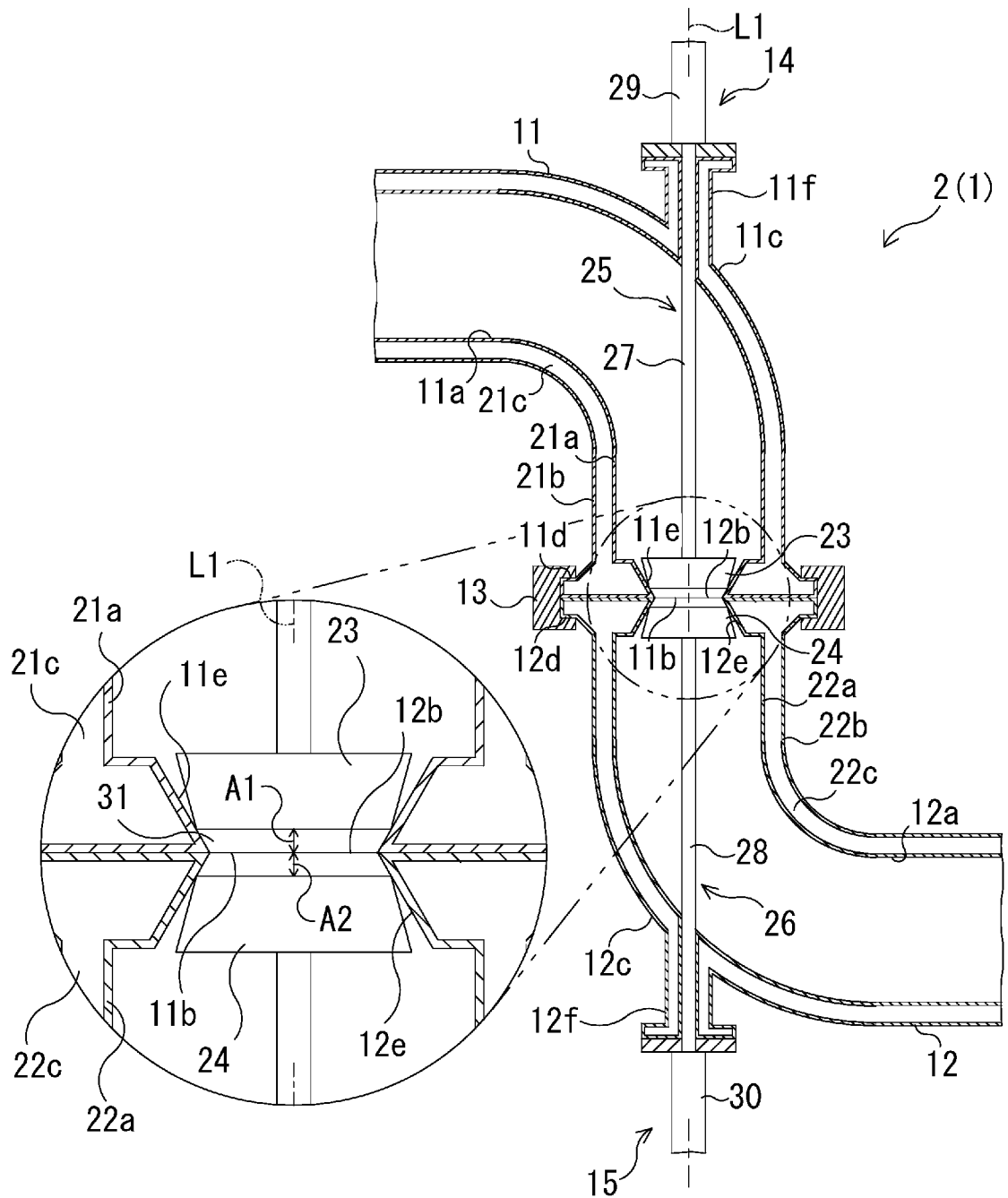
FIG. 2 is a cross-sectional view illustrating a state in which flow paths are closed with regard to the emergency release mechanism of FIG. 1.

Further, the valve bodies 23 and 24 are separated from each other in the axial direction while seating on the respective valve seats 11e and 12e as illustrated in FIG. 2. To describe it in more detail, the valve bodies 23 and 24 are separated from the respective opening ends 11b and 12b on inner sides of the pipe portions 11 and 12. In this embodiment, end surfaces of the valve bodies 23 and 24 on sides of the opening ends 11b and 12b are separated from the respective opening ends 11b and 12b by predetermined distances A1 and A2 on the inner sides of the pipe portions 11 and 12. In this manner, the valve bodies 23 and 24 do not hit each other while the pair of pipe portions 11 and 12 are coupled to each other. Thus, the valve bodies 23 and 24 can seat on the respective valve seats 11e and 12e while the pair of pipe portions 11 and 12 are coupled to each other. That is, the valve bodies 23 and 24 can close the respective flow paths 11a and 12a before the pair of pipe portions 11 and 12 are separated away from each other. Meanwhile, the valve bodies 23 and 24 are positioned on the respective inner sides of the pipe portions 11 and 12, and thus a closed space 31 is formed between the valve bodies 23 and 24 in a seating state. In view of the above, the predetermined distances A1 and A2 are set such that a volume of the closed space 31 becomes a predetermined volume or less. In this embodiment, the predetermined volume is 50 liters or less, and preferably 20 liters or less. However, the predetermined volume is not limited to the above-mentioned volume.

[Linear Motion Drive Devices]

The linear motion drive devices 25 and 26 move the corresponding valve bodies 23 and 24 along the flow paths 11a and 12a to cause the valve bodies 23 and 24 to seat on the respective valve seats 11e and 12e. To describe it in more detail, the linear motion drive devices 25 and 26 linearly move the respective valve bodies 23 and 24 between the closed position and the open position along the flow paths 11a and 12a. To describe it in further more detail, the linear motion drive devices 25 and 26 respectively include valve shafts 27 and 28 and drive units 29 and 30.

[Valve Shafts]

The valve shafts 27 and 28 are coupled to the respective valve bodies 23 and 24. In addition, the valve shafts 27 and 28 each extend in a predetermined direction. To describe it in more detail, the valve shafts 27 and 28 are each a long bar-shaped member extending in the predetermined direction. In addition, the valve bodies 23 and 24 are integrally provided to respective one end portions of the valve shafts 27 and 28 in the predetermined direction. Further, the valve shafts 27 and 28 are provided to the valve bodies 23 and 24 such that their axes match each other. In addition, in this embodiment, the valve shafts 27 and 28 are arranged along the axis L1 in which the one-end-side parts of the pipe portions 11 and 12 extend. That is, the predetermined direction matches the axial direction in this embodiment. It is to be noted that the predetermined direction is not always required to match the axial direction.

Further, the valve shafts 27 and 28 pass through the corresponding pipe portions 11 and 12 to be slidable in the axial direction. To describe it in more detail, the valve shafts 27 and 28 pass through the respective elbow parts 11c and 12c of the corresponding pipe portions 11 and 12. In addition, the valve shafts 27 and 28 are provided in the respective elbow parts 11c and 12c of the pipe portions 11 and 12 to be slidable in the axial direction. To describe it in more detail, the valve shafts 27 and 28 extend from the respective valve bodies 23 and 24 to sides opposite to the opening ends 11b and 12b along the axis L1. Thus, the valve shafts 27 and 28 pass through outer parts having a large curvature radius in the elbow parts 11c and 12c on an extension line of the axis L1. In addition, the valve shafts 27 and 28 axially slide in the respective elbow parts 11c and 12c so that the valve bodies 23 and 24 are moved between the open position and the closed position. It is to be noted that the valve shafts 27 and 28 pass through the respective elbow parts 11c and 12c to be slidable while sealing is achieved in this embodiment.

[Drive Units]

The drive units 29 and 30 move the corresponding valve bodies 23 and 24 in the axial direction via the valve shafts 27 and 28. To describe it in more detail, the drive units 29 and 30 move the corresponding valve bodies 23 and 24 between the open position and the closed position via the valve shafts 27 and 28. To describe it in further more detail, the drive units 29 and 30 are coupled to respective other end portions of the corresponding valve shafts 27 and 28 in the predetermined direction (in this embodiment, other end portions thereof in the axial direction). In addition, the drive units 29 and 30 linearly move the respective valve shafts 27 and 28 in the axial direction. That is, the drive units 29 and 30 reciprocate the respective valve shafts 27 and 28 along the axial direction. The drive units 29 and 30 each include a hydraulic cylinder in this embodiment. In addition, the drive units 29 and 30 each including the hydraulic cylinder are connected to a hydraulic circuit (not shown). The hydraulic circuit is controlled by a control device (not shown), and hydraulic oil is supplied to and discharged from the drive units 29 and 30 in accordance with a control signal from the control device. In addition, the drive units 29 and 30 move the respective valve shafts 27 and 28 in the axial direction through the supply or discharge of the hydraulic oil obtained by the hydraulic circuit. In this manner, the valve bodies 23 and 24 move between the open position and the closed position.

It is to be noted that the drive units 29 and 30 are not necessarily limited to hydraulic cylinders. For example, the drive units 29 and 30 may include electric motors and linear motion mechanisms (ball screw mechanisms, rack and pinion mechanisms, or the like), and are only required to be capable of linearly driving the valve shafts 27 and 28. In addition, when the drive units 29 and 30 are formed of electric motors, the drive units 29 and 30 move the respective valve shafts 27 and 28 on one side and the other side in the axial direction in accordance with a drive signal from the control device.

Further, the drive units 29 and 30 are provided to the respective elbow parts 11c and 12c of the corresponding pipe portions 11 and 12. That is, the drive units 29 and 30 are respectively provided on outer sides of the pipe portions 11 and 12. To describe it in more detail, mounting portions 11f and 12f are respectively formed in outer peripheral surfaces of the elbow parts 11c and 12c. In addition, the drive units 29 and 30 are mounted to the respective elbow parts 11c and 12c via the mounting portions 11f and 12f. In this embodiment, the valve shafts 27 and 28 pass through the respective elbow parts 11c and 12c so that the other end portions of the valve shafts 27 and 28 in the axial direction reach the respective mounting portions 11f and 12f. In addition, the drive units 29 and 30 communicate with the respective other end portions of the valve shafts 27 and 28 in the mounting portions 11f and 12f.

<Disconnection Performed by Emergency Release Mechanism>

In the emergency release mechanism 2, the valve bodies 23 and 24 are separated from the respective valve seats 11e and 12e at times other than the time of emergency in which there is a possibility that the onshore facility and the ship are separated from each other by a set distance or more (see FIG. 1). In this manner, the fluid can be transported via the fluid loading equipment 1 between the onshore facility and the tanker.

Figure 3:
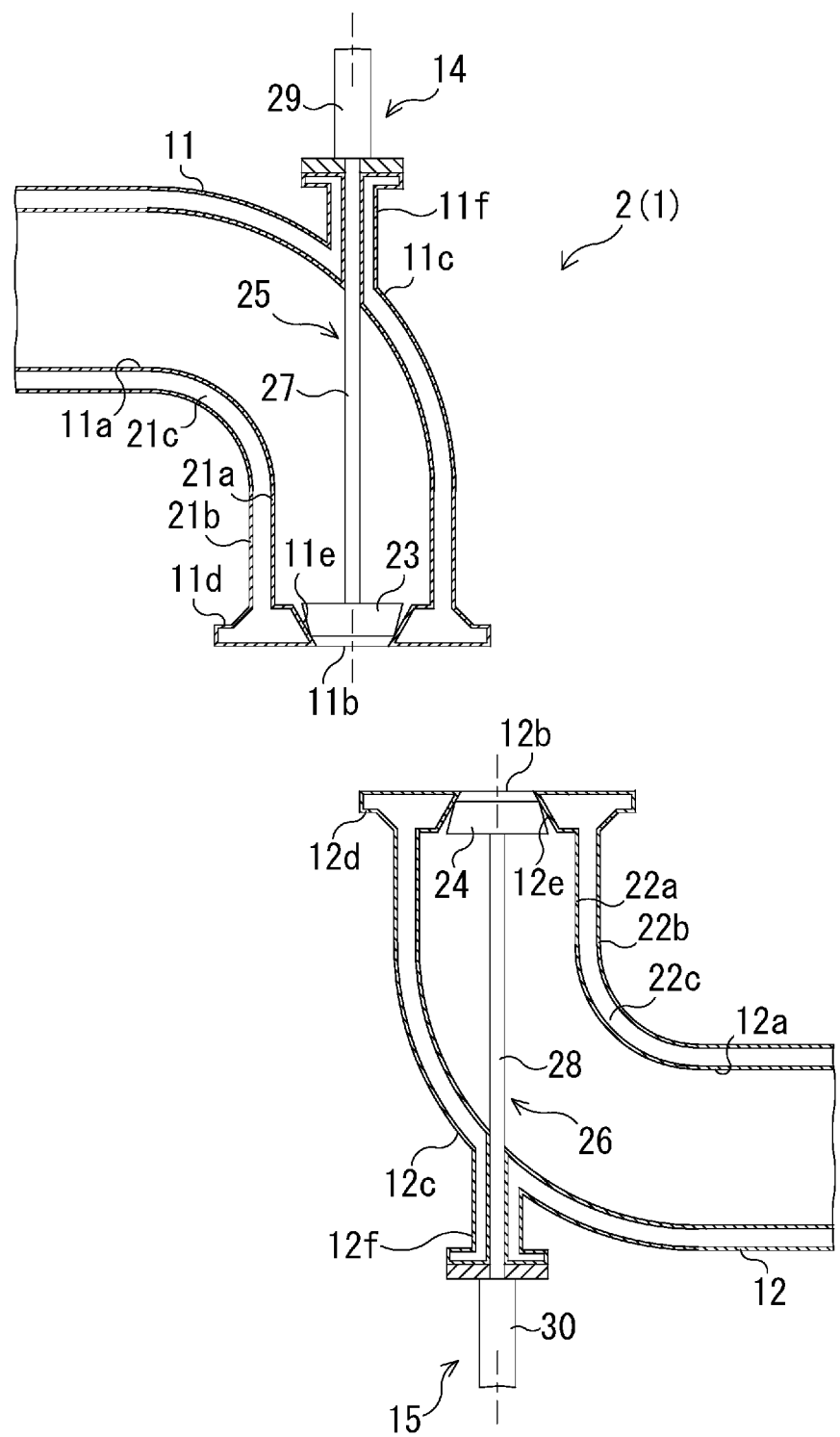
FIG. 3 is a cross-sectional view illustrating a state in which a pair of pipe portions are disconnected from each other with regard to the emergency release mechanism of FIG. 2.

Meanwhile, in the emergency release mechanism 2, at the time of emergency, the other pipe portion 12 is disconnected from the one pipe portion 11, and thus the tanker is disconnected from the onshore facility. To describe it in more detail, in the emergency release mechanism 2, at the time of emergency, for example, a control signal is output from the control device to the hydraulic circuit. In this case, the hydraulic oil is supplied or discharged with respect to the drive units 29 and 30. In this manner, the drive units 29 and 30 move the respective valve bodies 23 and 24 to the closed position via the valve shafts 27 and 28. In this case, the flow paths 11a and 12a are closed (see FIG. 2). Then, the coupling member 13 is removed from the flange portions 11d and 12d so that the other pipe portion 12 can be disconnected from the one pipe portion 11 (see FIG. 3). That is, the other pipe portion 12 can be disconnected from the one pipe portion 11 while the two flow paths 11a and 12a are closed. In this manner, at the time of emergency, the tanker can be separated from the onshore facility while a flow rate of leaking fluid is reduced.

In the emergency release mechanism 2 of this embodiment, the linear motion drive devices 25 and 26 are used to allow the valve bodies 23 and 24 to be moved with a large drive force. In this manner, even when the pipe portions 11 and 12 are increased in diameter, the valve bodies 23 and 24 can be moved against the fluid to close the respective flow paths 11a and 12a of the pipe portions 11 and 12. even when the pipes are increased in diameter, it is possible to close the valve bodies 23 and 24.

Further, in the emergency release mechanism 2, the valve bodies 23 and 24 can seat on the respective valve seats 11e and 12e while being separated from each other, and hence the flow paths 11a and 12a can be closed even while the opening ends 11b and 12b abut against each other. Thus, the flow paths 11a and 12a can be closed before the coupling member 13 is removed from the pair of pipe portions 11 and 12. In this manner, the flow rate of the fluid leaking from the flow paths 11a and 12a can be reduced when the pair of pipe portions 11 and 12 are separated away from each other. To describe it more specifically, the flow rate of the fluid leaking from the flow paths 11a and 12a can be reduced to an amount corresponding to the volume of the closed space 31. It is to be noted that the amount corresponding to the volume of the closed space 31 can be set by the predetermined distances A1 and A2, and hence the fluid can be prevented from leaking in an undesired flow rate.

Moreover, in the emergency release mechanism 2, the valve shafts 27 and 28 pass through the respective elbow parts 11c and 12c, and the drive units 29 and 30 are provided to the respective elbow parts 11c and 12c. Thus, shorter valve shafts 27 and 28 can protrude from the respective pipe portions 11 and 12, and hence lengths of the valve shafts 27 and 28 can be reduced. In this manner, weights of the valve shafts 27 and 28 can be reduced, and thus the drive units 29 and 30 can be downsized. Further, reduction of the lengths of the valve shafts 27 and 28 allows suppression of shaft runout of the valve shafts 27 and 28.

Further, in the emergency release mechanism 2, the hydraulic cylinder is used for each of the drive units 29 and 30, and hence the emergency release mechanism 2 can be used more safely. Moreover, the drive units 29 and 30 are exposed to outside air, and hence, when fluid at a cryogenic temperature such as liquefied hydrogen is transported, reduction of a temperature of the hydraulic oil for operating the drive units 29 and 30 can be suppressed. In this manner, viscosity of the hydraulic oil can be ensured.

OTHER EMBODIMENTS

In the emergency release mechanism 2 of this embodiment, the pipe portions 11 and 12 are each formed into an L-shape, but the shape is not limited thereto and may be, for example, a straight shape. Further, in the case of the straight shape, the valve shafts 27 and 28 extend in an intersecting direction intersecting with the axis of the pipe portions (slope with respect to the axis is 30 degrees or less) to move the respective valve bodies 23 and 24 in the intersecting direction. At this time, the valve seats are also formed to tilt in the intersecting direction with respect to the axis of the pipe portions.

Further, in the emergency release mechanism 2, both of the valve bodies 23 and 24 in the seating state are separated from the opening ends 11b and 12b on axially inner sides of the pipe portions 11 and 12, but the following configuration may be employed. That is, only one of the two valve bodies 23 and 24 may be separated from the opening ends 11b and 12b on the axially inner side of the pipe portions 11 and 12.

The two valve bodies 23 and 24 may have any arrangement as long as the two valve bodies 23 and 24 are separated from each other in the seating state. Further, in the emergency release mechanism 2, at the time of emergency, a signal is not necessarily required to be output to the hydraulic circuit from the control device. For example, the emergency release mechanism 2 may be configured such that the hydraulic circuit is manually operated to move the valve bodies 23 and 24. Further, in this embodiment, the fluid loading equipment 1 transports fluid between the onshore facility and the ship, but a target for transportation is not limited to between the onshore facility and the tanker. For example, the fluid loading equipment 1 may transport fluid between ships or between an onshore facility and a vehicle, and the target for transporting the fluid may be any target. Further, the ship is not limited to a tanker, and may be a fuel ship that sails with use of fluid as fuel.

From the description above, various modifications and alternative embodiments of the present invention are apparent to the person skilled in the art. Accordingly, the description above should only be interpreted as illustrative, and is provided for the purpose of teaching the best mode for carrying out the present invention to the person skilled in the art. The details of structures and/or functions of the present invention may be substantially modified without departing from the scope of the present invention.

The invention claimed is:

1. An emergency release mechanism of fluid loading equipment for transporting fluid, the emergency release mechanism comprising:
   a pair of pipe portions in which respective flow paths for transporting the fluid are formed and that are arranged with opening ends abutting against each other, the pair of pipe portions having a vacuum double structure including an inner tube part and an outer tube part between which a vacuum layer is formed;
   a coupling member capable of coupling the pair of pipe portions to each other and being removed therefrom; and
   a pair of shutoff valves configured to shut off the respective flow paths, the pair of shutoff valves being provided to correspond to the respective pair of pipe portions, wherein
   the pair of pipe portions include respective valve seats formed in the respective flow paths,
   the shutoff valves include respective valve bodies configured to seat on the respective valve seats of the corresponding pipe portions to close the respective flow paths, and respective linear motion drive devices configured to move the respective valve bodies along the respective flow paths to cause the respective valve bodies to seat on the respective valve seats,
   the respective valve bodies are positioned to be separated from each other while seating on the respective valve seats,
   each of the pipe portions includes an elbow part formed in an intermediate part, and is bent by the elbow part,
   each of the respective linear motion drive devices includes a valve shaft that is coupled to a corresponding one of the respective valve bodies and extends in a predetermined direction, and a drive unit configured to move the corresponding one of the respective valve bodies in the predetermined direction via the valve shaft,
   the drive unit of each of the respective linear motion drive devices includes a hydraulic cylinder, and is provided to the elbow part, on an outer side of a corresponding one of the pipe portions, and
   the valve shaft passes through the elbow part to be slidable in the predetermined direction.

* * * * *